(12) United States Patent
Chai et al.

(10) Patent No.: US 9,980,164 B2
(45) Date of Patent: May 22, 2018

(54) MEASUREMENT METHOD AND APPARATUS, AND COMMUNICATIONS NODE

(71) Applicant: Huawei Technologies Co., Ltd., Shenzhen, Guangdong (CN)

(72) Inventors: Li Chai, Beijing (CN); Jie Shi, Beijing (CN); Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 159 days.

(21) Appl. No.: 14/804,050

(22) Filed: Jul. 20, 2015

(65) Prior Publication Data
US 2015/0327098 A1 Nov. 12, 2015

Related U.S. Application Data

(63) Continuation of application No. PCT/CN2013/070725, filed on Jan. 18, 2013.

(51) Int. Cl.
*H04W 4/00* (2018.01)
*H04W 24/08* (2009.01)
(Continued)

(52) U.S. Cl.
CPC ........... *H04W 24/08* (2013.01); *H04W 24/10* (2013.01); *H04W 52/0206* (2013.01); *Y02B 60/50* (2013.01)

(58) Field of Classification Search
CPC .............................. H04W 14/08; H04W 24/10
(Continued)

(56) References Cited

U.S. PATENT DOCUMENTS

| 2013/0044685 A1* | 2/2013 | Fong | .................... H04J 11/0053 370/328 |
| 2013/0128761 A1* | 5/2013 | Kang | .................. H04W 72/046 370/252 |

(Continued)

FOREIGN PATENT DOCUMENTS

| CN | 101064899 A | 10/2007 |
| CN | 101094482 A | 12/2007 |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.2.0, Dec. 2012, 340 pages.

(Continued)

*Primary Examiner* — Farah Faroul

(57) ABSTRACT

A measurement method and apparatus, and a communications node are disclosed, where the measurement method includes: sending, by a first communications node, measurement information to a second communications node, where the measurement information includes information of a measurement signal type, and the information of the measurement signal type is used by the second communications node to determine a signaling type corresponding to a measurement signal; and receiving, by the first communications node, a measurement report sent by the second communications node, where the measurement report carries a measurement result of measurement performed by the second communications node according to the measurement information. Embodiments of the present invention implement measurement on a radio link signal according to a received measurement signal type.

4 Claims, 6 Drawing Sheets

A first communications node sends measurement information to a second communications node, where the measurement information includes information of a measurement signal type, and the information of the measurement signal type is used by the second communications node to determine a signaling type corresponding to a measurement signal — 101

The first communications node receives a measurement report sent by the second communications node, where the measurement report carries a measurement result of measurement performed by the second communications node according to the measurement information — 102

(51) Int. Cl.
*H04W 24/10* (2009.01)
*H04W 52/02* (2009.01)

(58) Field of Classification Search
USPC .......................................................... 370/252
See application file for complete search history.

(56) References Cited

U.S. PATENT DOCUMENTS

| | | | |
|---|---|---|---|
| 2014/0112184 A1 | 4/2014 | Chai | |
| 2014/0192671 A1* | 7/2014 | Lim | H04W 24/08 370/252 |
| 2014/0286280 A1* | 9/2014 | Seo | H04B 7/0626 370/329 |

FOREIGN PATENT DOCUMENTS

| | | |
|---|---|---|
| CN | 102448088 A | 5/2012 |
| CN | 102882612 A | 1/2013 |
| EP | 2 733 982 A1 | 5/2014 |
| WO | WO 2013/005855 A1 | 1/2013 |
| WO | WO 2013/007207 A1 | 1/2013 |

OTHER PUBLICATIONS

"CSI-RS based RRM measurement for synchronised new carriers", New Postcom, 3GPP TSG RAN WG1 Meeting #71, Nov. 12-16, 2012, 4 pages, R1-124949.

* cited by examiner

MEASUREMENT METHOD AND APPARATUS, AND COMMUNICATIONS NODE

CROSS-REFERENCE TO RELATED APPLICATIONS

This application is a continuation of International Application No. PCT/CN2013/070725, filed on Jan. 18, 2013, which is hereby incorporated by reference in its entirety.

TECHNICAL FIELD

The present invention relates to the field of communications technologies, and in particular, to a measurement method and apparatus, and a communications node.

BACKGROUND

In the communications field, to perform mobility management on a user equipment (UE), a radio link needs to be measured, to evaluate, according to a measurement result, quality of a signal received from a cell by the UE. Currently, reference signaling for measurement mainly includes a cell-specific reference signal (CRS) and a channel state information reference signal (CSI-RS).

In an existing measurement manner, a network side delivers measurement control information to a UE to regulate a measurement behavior and a measurement reporting criterion of a user; the UE measures a neighboring cell of an access cell, and reports, to the network side, a measurement result conforming to the reporting criterion in a form of a measurement report, where the measurement report includes an identity of a cell conforming to the reporting criterion. The network side performs mobility management (for example, a handover decision) on the UE according to the measurement result reported by the UE. In an existing measurement manner, reference signaling (a CRS or a CSI-RS) highly corresponds to a measurement type, and the network side does not constrain the measurement behavior of the UE excessively. However, with the development of communications technologies, measurement cannot be implemented according to a measurement signal type in the existing measurement manner.

SUMMARY

Embodiments of the present invention provide a measurement method and apparatus, and a communications node, to implement measurement of a radio link signal according to a received measurement signal type.

To resolve the foregoing technical problem, the embodiments of the present invention disclose the following technical solutions:

A first aspect provides a measurement method, where the method includes:

sending, by a first communications node, measurement information to a second communications node, where the measurement information includes information of a measurement signal type, and the information of the measurement signal type is by the second communications node to determine a signaling type corresponding to a measurement signal; and receiving, by the first communications node, a measurement report sent by the second communications node, where the measurement report carries a measurement result of measurement performed by the second communications node according to the measurement information.

A second aspect provides a measurement method, including:

selecting, by a second communications node, information that is of a measurement signal type and for measurement;

measuring, by the second communications node according to a signaling type corresponding to the selected information of the measurement signal type, a measurement signal corresponding to the signaling type to obtain a measurement report; and sending, by the second communications node, the measurement report to a first communications node, where the measurement report carries a measurement result of measurement performed by the second communications node on a measurement signal corresponding to the information of the measurement signal type.

A third aspect provides a measurement method, including:

receiving, by a first communications node, a measurement report sent by a second communications node, where the measurement report carries a measurement result of measurement performed by the second communications node on a measurement signal corresponding to selected information that is of a measurement signal type and for measurement; and determining, by the first communications node, signal quality of the second communications node according to the measurement report, and performing mobility management and scheduling on the second communications node.

A fourth aspect provides a measurement apparatus, where the measurement apparatus is located on a first communications node, and includes:

a sending unit, configured to send measurement information to a second communications node, where the measurement information includes information of a measurement signal type, and the information of the measurement signal type is used by the second communications node to determine a signaling type corresponding to a measurement signal; and a receiving unit, configured to receive a measurement report sent by the second communications node, where the measurement report carries a measurement result of measurement performed by the second communications node according to the measurement information.

A fifth aspect provides a measurement apparatus, where the measurement apparatus is located on a second communications node, and includes:

a receiving unit, configured to receive measurement information sent by a first communications node, where the measurement information includes information of a measurement signal type, and the information of the measurement signal type is used by the second communications node to determine a signaling type corresponding to a measurement signal;

a measurement unit, configured to determine, according to the measurement information, the signaling type corresponding to the measurement signal, and measure the measurement signal corresponding to the signaling type to obtain a measurement report; and a sending unit, configured to send the measurement report to the first communications node, where the measurement report carries a measurement result of measurement performed by the measurement apparatus according to the measurement information.

A sixth aspect provides a measurement apparatus, where the measurement apparatus is located on a second communications node, and includes:

a selecting unit, configured to select information that is of a measurement signal type and for measurement;

a measurement unit, configured to measure, according to a signaling type corresponding to the selected information of the measurement signal type, a measurement signal corresponding to the signaling type to obtain a measurement report; and a sending unit, configured to send the measurement report to a first communications node, where the measurement report carries a measurement result of measurement performed by the measurement apparatus on a measurement signal corresponding to the information of the signal type.

A seventh aspect provides a measurement apparatus, where the measurement apparatus is located on a first communications node, and includes:

a receiving unit, configured to receive a measurement report sent by a second communications node, where the measurement report carries a measurement result of measurement performed by the second communications node on a measurement signal corresponding to selected information that is of a measurement signal type and for measurement; and a management unit, configured to determine signal quality of the second communications node according to the measurement report, and perform mobility management and scheduling on the second communications node.

An eighth aspect provides a communications node, including:

a transceiver, configured to send measurement information to a second communications node, where the measurement information includes information of a measurement signal type, and the information of the measurement signal type is used by the second communications node to determine a signaling type corresponding to a measurement signal; and receive a measurement report sent by the second communications node, where the measurement report carries a measurement result of measurement performed by the second communications node according to the measurement information.

A ninth aspect provides a communications node, including:

a transceiver, configured to receive measurement information sent by a first communications node, where the measurement information includes information of a measurement signal type, and the information of the measurement signal type is used by the communications node to determine a signaling type corresponding to a measurement signal; and a processor, configured to determine, according to the measurement information, the signaling type corresponding to the measurement signal, and measure the measurement signal corresponding to the signaling type to obtain a measurement report; where the transceiver is further configured to send the measurement report to the first communications node, where the measurement report carries a measurement result of measurement performed by the communications node according to the measurement information.

A tenth aspect provides a communications node, including:

a processor, configured to select information that is of a measurement signal type and for measurement, and measure, according to a signaling type corresponding to the selected information of the measurement signal type, a measurement signal corresponding to the signaling type to obtain a measurement report; and a transceiver, configured to send the measurement report to a first communications node, where the measurement report carries a measurement result of measurement performed by the communications node on a measurement signal corresponding to the information of the measurement signal type.

An eleventh aspect provides a communications node, including:

a transceiver, configured to receive a measurement report sent by a second communications node, where the measurement report carries a measurement result of measurement performed by the second communications node on a measurement signal corresponding to selected information that is of a measurement signal type and for measurement; and a processor, configured to determine signal quality of the second communications node according to the measurement report, and perform mobility management and scheduling on the second communications node.

It can be learned from the foregoing technical solutions that, in the embodiments of the present invention, a first communications node configures, for a second communications node, measurement information of a measurement signal type, and sends the measurement information to the second communications node, so that the second communications node measures a measurement signal corresponding to the measurement signal type and feeds back a measurement result to the first communications node, thereby facilitating management on the second communications node by the first communications node.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
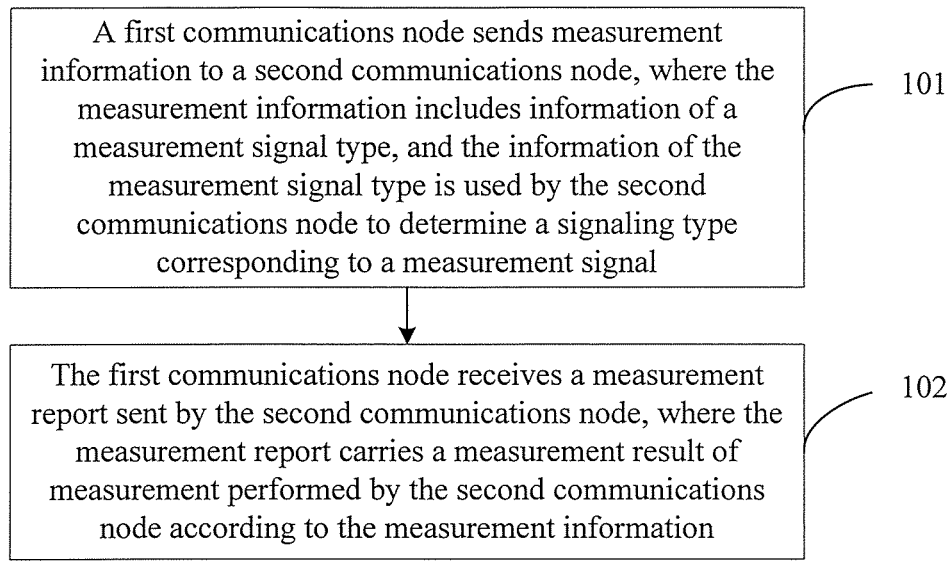
FIG. 1 is a flowchart of a measurement method according to an embodiment of the present invention.

Referring to FIG. 1, FIG. 1 is a flowchart of a measurement method according to an embodiment of the present invention, and the method includes the following steps:

Step 101: A first communications node sends measurement information to a second communications node, where the measurement information includes information of a measurement signal type, and the information of the measurement signal type is used by the second communications node to determine a signaling type corresponding to a measurement signal.

In an embodiment, the first communications node may be abase station, and the second communications node may be a UE (which may be one UE, or may be multiple UEs in this embodiment, which is not limited in this embodiment); that is, abase station sends measurement information configured by the base station to a user equipment UE, so that the UE determines, according to measurement signal configuration information in the measurement information, a measurement signal resource corresponding to the measurement signal configuration information, and measures the measurement signal corresponding to the resource. Then, the UE may send a measurement result to the base station.

In another embodiment, both the first communications node and the second communications node may be UEs. In this case, a UE that is used as the first communications node may configure measurement information for another UE (that is, the second communications node), and send the measurement information configured by the UE to the other UE (which may be one UE or multiple UEs, which is not limited in this embodiment). After receiving the measurement information, the other UE determines, according to measurement signal configuration information in the measurement information, a measurement signal resource corresponding to the measurement signal configuration information, and measures the measurement signal corresponding to the resource. Then, the other UE (that is, the second communications node) sends a measurement result to the UE (that is, the first communications node).

In another embodiment, both the first communications node and the second communications node may be base stations. In this case, a base station that is used as the second communication node integrates a measurement function of a UE. A base station (that is, the first communications node) configures measurement information for another base station (that is, the second communications node), and sends the measurement information configured by the base station to the other base station. After receiving the measurement information, the other base station determines a corresponding measurement signal resource according to the measurement information, and measures the measurement signal corresponding to the resource. Then, the other base station (that is, the second communications node) sends a measurement result to the base station (that is, the first communications node).

The first communications node (for example, a base station) may select the measurement signal type in the measurement information according to a change of a radio signal of a cell in a specific scenario.

Step 102: The first communications node receives a measurement report sent by the second communications node, where the measurement report carries a measurement result of measurement performed by the second communications node according to the measurement information.

In this embodiment, the first communications node receives the measurement report sent by the second communications node (which may be a UE or a base station that integrates a measurement function of a UE), where the measurement report carries the measurement result of the measurement performed by the second communications node according to the measurement information. Then, the first communications node manages the second communications node according to the measurement result. The following describes, by using two cases as examples, a process during which the first communications node manages the second communications node according to the measurement result in this embodiment of the present invention, which, however, is not limited to the following two cases, and another case may further be managed according to different content included in the measurement result, which is not limited in this embodiment.

In one case, after obtaining the measurement report, the first communications node can determine signal quality and signal strength of a measured cell/carrier according to the measurement result, and manage the second communications node and the measured cell/carrier, where the managing the second communications node and the measured cell/carrier includes: determining, by the first communications node, whether to add or delete a carrier for the second communications node, or add a cell to a CoMP set or delete a cell from a CoMP set; or determining whether to perform a handover to or from the measured cell/carrier for the second communications node.

Another case is that, after obtaining the measurement report, the first communications node can determine signal quality of a UE in a serving cell/carrier (set) according to the measurement result, and select a scheduling mechanism that is suitable for the second communications node.

Another case is that, the first communications node receives the measurement report reported by the second communications node, where the measurement report includes a measurement result obtained by the second communications node by measuring a designated cell/carrier corresponding to the measurement information, and the following uses two cases as examples, which is not limited thereto.

One case is that, if the measurement information is RRM measurement, after obtaining the measurement report, the first communications node can determine signal quality and signal strength of a designated cell/carrier according to the measurement result, so that the first communications node manages the second communications node and the designated cell/carrier. For example, the base station determines whether to add a new carrier for the user equipment, add a cell to a CoMP set, or maintain the designated cell/carrier; or determines an inter-cell handover scenario.

The other case is that, if the measurement information is CSI reporting, after obtaining the measurement report, the first communications node can determine signal quality of the second communications node in a serving cell/carrier (set) according to the measurement result, so that the first communications node determines a scheduling mechanism for the second communications node.

In this embodiment of the present invention, a first communications node configures, for a second communications node, measurement information of a measurement signal type, and sends the measurement information to the second communications node, so that the second communications node measures a measurement signal corresponding to the measurement signal type, and feeds back a measurement result to the first communications node, thereby facilitating management on the second communications node by the first communications node.

Optionally, on a basis of the foregoing embodiment, in another embodiment, the measurement signal type includes at least one of the following: cell-specific reference signal (CRS) whole-set measurement, CRS restricted measurement, channel state information reference signal (CSI-RS) measurement, discovery reference signal (DRS) measurement, CRS and DRS hybrid measurement, channel state information reference signal (CSI-RS) and DRS hybrid measurement, CRS and CSI-RS hybrid measurement, and DRS, CRS, and CSI-RS hybrid measurement.

Optionally, on a basis of the foregoing embodiment, in another embodiment, the CRS and DRS hybrid measurement, CSI-RS and DRS hybrid measurement, or DRS, CRS, and CSI-RS hybrid measurement type is used to instruct the second communications node to obtain an initial value of a measured frequency or cell by measuring a DRS, and obtain a further measurement value by measuring a CRS and/or a CSI-RS.

Optionally, on a basis of the foregoing embodiment, in another embodiment, the CRS and DRS hybrid measurement, CSI-RS and DRS hybrid measurement, or DRS, CRS, and CSI-RS hybrid measurement type is further used to instruct the second communications node to determine, by measuring a DRS to obtain a measured frequency or cell, whether the measured frequency or cell satisfies an event triggering condition, and determine whether a further measurement value obtained by measuring a CRS and/or a CSI-RS satisfies a time to trigger (TTT) condition.

That is, in the foregoing embodiment, for selection of a measurement signal type, the first communications node (for example, a base station) may select the measurement signal type according to a change of a radio signal of a cell in a specific scenario. For example, the change of the radio signal of the cell is relatively fast, and to avoid a ping-pong handover and a premature handover that are caused by dependence only on DRS measurement, CRS and DRS hybrid measurement, CSI-RS and DRS hybrid measurement, DRS, CRS, and CSI-RS hybrid measurement, or the like may be used, which is not limited thereto.

For example, the UE first obtains an initial value of a neighboring cell by measuring a DRS, and then measures a CRS and/or a CSI-RS to meet a subsequent reporting requirement of hysteresis and TTT.

Figure 2:
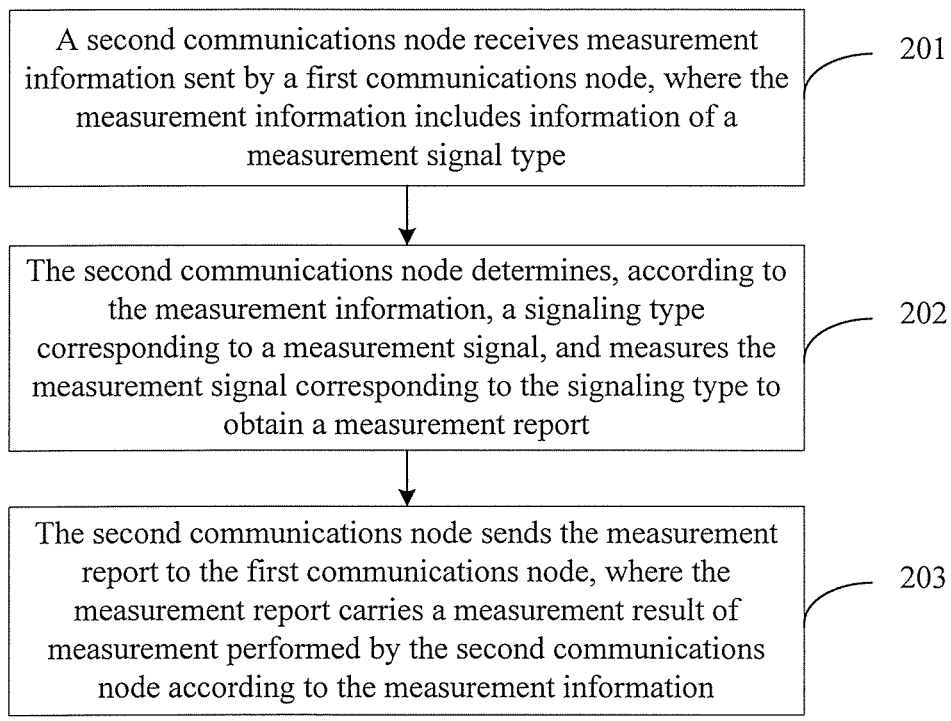
FIG. 2 is another flowchart of a measurement method according to an embodiment of the present invention.

Further referring to FIG. 2, FIG. 2 is another flowchart of a measurement method according to an embodiment of the present invention, and the method includes the following steps:

Step 201: A second communications node receives measurement information sent by a first communications node, where the measurement information includes information of a measurement signal type.

In this embodiment, a manner in which the second communications node receives the measurement information is not limited. If the second communications node is a UE and the first communications node is a base station, or the second communications node is a base station and the first communications node is a UE, each interaction message between the UE and the base station may carry the measurement information. If both the first communications node and the second communications node are UEs, interaction information between the two UEs may also carry the measurement information. If the first communications node is a base station and the second communication node is a base station that integrates a measurement function of a UE, interaction information on an X2 interface or another interface (for example, a wireless interface) between the two base stations may be used to carry the measurement information, which is not limited in this embodiment.

The measurement signal type includes at least one of the following: cell-specific reference signal (CRS) whole-set measurement, CRS restricted measurement, channel state information reference signal (CSI-RS) measurement, discovery reference signal (DRS) measurement, CRS and DRS hybrid measurement, CSI-RS and DRS hybrid measurement, CRS and CSI-RS hybrid measurement, and DRS, CRS, and CSI-RS hybrid measurement.

The CRS and DRS hybrid measurement, CSI-RS and DRS hybrid measurement, or DRS, CRS, and CSI-RS hybrid measurement type is used to instruct the second communications node to obtain an initial value of a measured frequency or cell by measuring a DRS, and obtain a further measurement value by measuring a CRS and/or a CSI-RS.

The CRS and DRS hybrid measurement, CSI-RS and DRS hybrid measurement, or DRS, CRS, and CSI-RS hybrid measurement type is used to instruct the second communications node to determine, by measuring a DRS to obtain a measured frequency or cell, whether the measured frequency or cell satisfies an event triggering condition, and determine whether a further measurement value obtained by measuring a CRS and/or a CSI-RS satisfies a TTT condition.

Step 202: The second communications node determines, according to the measurement information, a signaling type corresponding to a measurement signal, and measures the measurement signal corresponding to the signaling type to obtain a measurement report.

After receiving the measurement information sent by the first communications node (for example, a base station or a base station that integrates a measurement function of a UE), the second communications node (for example, a UE) may determine, according to the measurement information, the signaling type corresponding to the measurement signal, and then measure the measurement signal corresponding to the signaling type.

In this embodiment, that the second communications node may determine, according to the measurement information, the signaling type corresponding to the measurement signal uses the following two cases as examples:

One case is that, if the measurement information received by the second communications node includes the information of the measurement signal type, the second communications node may automatically select a type of signaling to be measured and a measurement manner according to a new mechanism;

if the second communications node (for example, a UE) is connected to a macro cell, and a signal level and/or signal quality of a serving cell of the second communications node is higher than a threshold, for example, RSRP>Threshold, the second communications node uses a DRS measurement type to perform neighboring cell measurement;

if a signal level and/or signal quality of a serving cell of the second communications node is lower than a threshold, for example, the second communications node is at an edge of a cell, and RSRP<Threshold, the second communications node uses a 'CRS or CSI-RS or DRS with CRS/CSI-RS measurement type' to perform neighboring cell measurement; or if the second communications node is connected to a small cell, for example, an NCT cell, the second communications node uses a DRS measurement type to perform neighboring cell measurement. The neighboring cell in this embodiment may be an intra-frequency neighboring cell or an inter-frequency neighboring cell.

In the other case, the second communications node (for example, a UE) may also select a measurement signal type by grasping a change of a radio signal of a cell in a specific scenario according to historical measurement signaling. For example, the change of the radio signal of the cell is relatively fast; to avoid a ping-pong handover and a premature handover that are caused by dependence only on DRS measurement, CRS and DRS hybrid measurement, CSI-RS and DRS hybrid measurement, or DRS, CRS, and CSI-RS hybrid measurement may be used. For example, the UE first obtains an initial value of a neighboring cell by measuring a DRS, and then measures a CRS and/or a CSI-RS to meet a subsequent reporting requirement of hysteresis and TTT.

Step 203: The second communications node sends the measurement report to the first communications node, where the measurement report carries a measurement result of measurement performed by the second communications node according to the measurement information.

In this embodiment of the present invention, a second communications node determines, according to received measurement information, a signaling type corresponding to a measurement signal, and measures the measurement signal corresponding to the signaling type, which satisfies a measurement requirement of a first communications node; and sends a measurement result to the first communications node, so that the first communications node manages the second communications node according to the measurement result.

Figure 3:
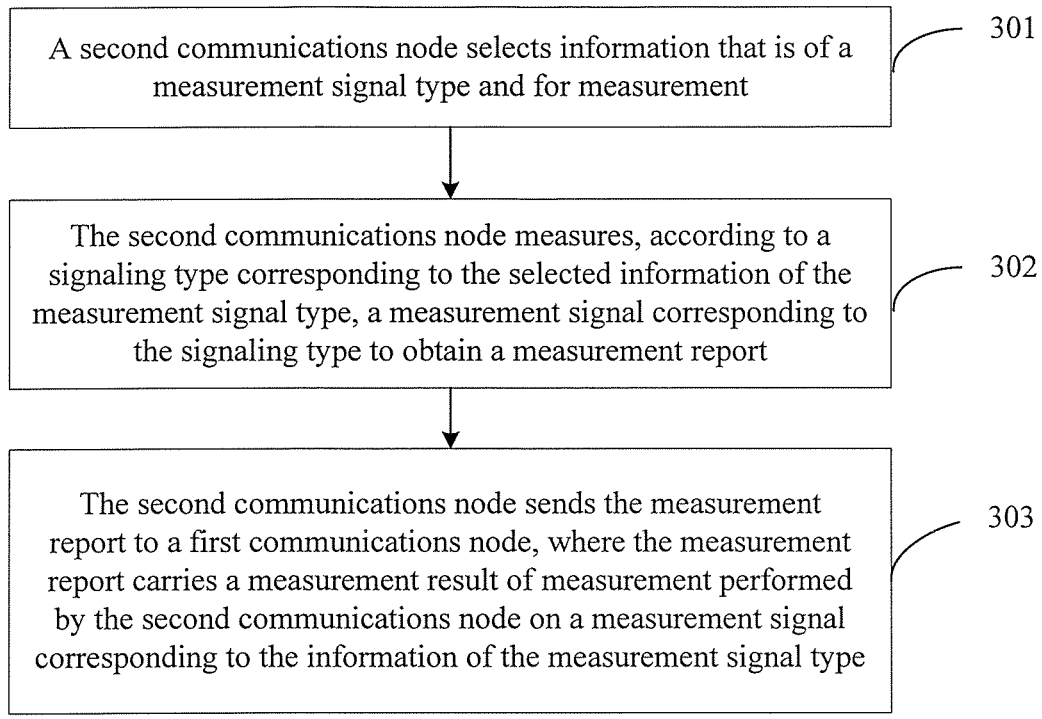
FIG. 3 is another flowchart of a measurement method according to an embodiment of the present invention.

Further referring to FIG. 3, FIG. 3 is another flowchart of a measurement method according to an embodiment of the present invention, and the method includes the following steps:

Step 301: A second communications node selects information that is of a measurement signal type and for measurement.

In this step, this embodiment provides description by using an example in which there are two manners in which the second communications node selects the information that is of the measurement signal type and for measurement, which is not limited thereto.

One manner is that, if the second communications node is connected to a macro cell, and a signal level and/or signal quality of a serving cell of the second communications node is higher than a preset threshold, the second communications node selects DRS measurement to perform neighboring cell measurement; otherwise, the second communications node selects CRS and DRS hybrid measurement, CSI-RS and DRS hybrid measurement, or DRS, CRS, and CSI-RS hybrid measurement to perform neighboring cell measurement; or if the second communications node is connected to a small cell, the second communications node selects DRS measurement to perform neighboring cell measurement, where the neighboring cell measurement includes intra-frequency neighboring cell measurement or inter-frequency neighboring cell measurement.

The other manner is that, the second communications node selects the measurement signal type according to a historical measurement signal and/or a change of a radio signal of a cell.

The selecting the measurement signal type according to a change of a radio signal of a cell includes: if the change of the radio signal of the cell is relatively fast, selecting CRS and DRS hybrid measurement, CSI-RS and DRS hybrid measurement, or DRS, CRS, and CSI-RS hybrid measurement.

Optionally, the CRS and DRS hybrid measurement, CSI-RS and DRS hybrid measurement, or DRS, CRS, and CSI-RS hybrid measurement type is used to instruct the second communications node to obtain an initial value of a measured frequency or cell by measuring a DRS, and obtain a further measurement value by measuring a CRS and/or a CSI-RS.

Optionally, the CRS and DRS hybrid measurement, CSI-RS and DRS hybrid measurement, or DRS, CRS, and CSI-RS hybrid measurement type is further used to instruct the second communications node to determine, by measuring a DRS to obtain a measured frequency or cell, whether the measured frequency or cell satisfies an event triggering condition, and determine whether a further measurement value obtained by measuring a CRS and/or a CSI-RS satisfies a TTT condition.

Step 302: The second communications node measures, according to a signaling type corresponding to the selected information of the measurement signal type, a measurement signal corresponding to the signaling type to obtain a measurement report.

Step 303: The second communications node sends the measurement report to a first communications node, where the measurement report carries a measurement result of measurement performed by the second communications node on a measurement signal corresponding to the information of the measurement signal type.

In this embodiment of the present invention, the second communications node may select the information of the measurement signal type according to a condition of the second communications node, measure a measurement signal corresponding to the selected information of the measurement signal type, and send a measurement result to a first communications node, so that the first communications node manages the second communications node according to the measurement result.

Figure 4:
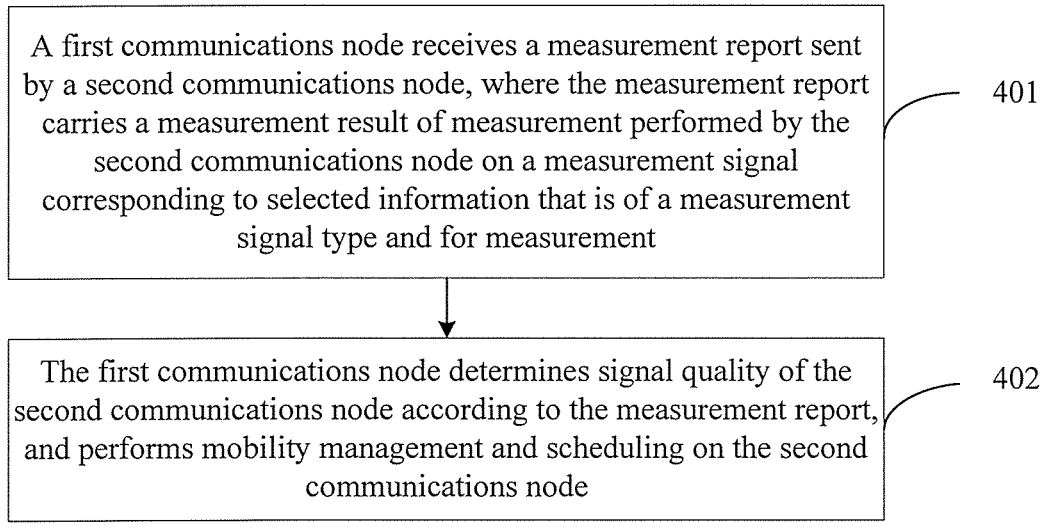
FIG. 4 is another flowchart of a measurement method according to an embodiment of the present invention.

Further referring to FIG. 4, FIG. 4 is another flowchart of a measurement method according to an embodiment of the present invention, and the method includes the following steps:

Step 401: A first communications node receives a measurement report sent by a second communications node, where the measurement report carries a measurement result of measurement performed by the second communications node on a measurement signal corresponding to selected information that is of a measurement signal type and for measurement; and Step 402: The first communications node determines signal quality of the second communications node according to the measurement report, and performs mobility management and scheduling on the second communications node.

In this embodiment, in one case, after obtaining the measurement report, a base station can determine signal quality and signal strength of a designated cell/carrier of the second communications node according to the measurement result, so that the base station manages the second communications node and the designated cell/carrier. For example, the base station determines whether to add a new carrier for a user equipment, add a cell to a CoMP set, or maintain the designated cell/carrier; or determines an inter-cell handover scenario.

In another case, after obtaining the measurement report, a base station can determine signal quality of the second communications node in a serving cell/carrier (set) according to the measurement result, so that the first communications node determines a scheduling mechanism for the second communications node.

In this embodiment of the present invention, a second communications node measures a measurement signal corresponding to measurement signal configuration information in received measurement information, and feeds back a measurement result to a first communications node, so that the first communications node manages the second communications node.

Figure 5:
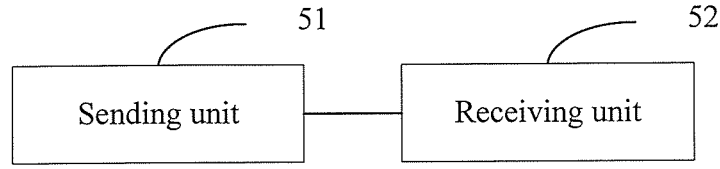
FIG. 5 is a schematic structural diagram of a measurement apparatus according to an embodiment of the present invention.

Based on an implementation process of the foregoing method, an embodiment of the present invention further provides a measurement apparatus, and a schematic structural diagram of the measurement apparatus is shown in FIG. 5. The measurement apparatus is located on a first communications node and includes a sending unit 51 and a receiving unit 52, where the sending unit 51 is configured to send measurement information to a second communications node, where the measurement information includes information of a measurement signal type, and the information of the measurement signal type is used by the second communications node to determine a signaling type corresponding to a measurement signal; and the receiving unit 52 is configured to: after the sending unit 51 sends the measurement information to the second communications node, receive a measurement report sent by the second communications node, where the measurement report carries a measurement result of measurement performed by the second communications node according to the measurement information.

Optionally, on a basis of the foregoing embodiment, in another embodiment, the measurement signal type sent by the sending unit includes at least one of the following: cell-specific reference signal (CRS) whole-set measurement, CRS restricted measurement, channel state information reference signal (CSI-RS) measurement, discovery reference signal (DRS) measurement, CRS and DRS hybrid measurement, CSI-RS and DRS hybrid measurement, CRS and CSI-RS hybrid measurement, and DRS, CRS, and CSI-RS hybrid measurement.

Optionally, on a basis of the foregoing embodiment, in another embodiment, the CRS and DRS hybrid measurement, CSI-RS and DRS hybrid measurement, and DRS, CRS, and CSI-RS hybrid measurement types in the measurement signal type sent by the sending unit are all used to instruct a UE to obtain an initial value of a measured frequency or cell by measuring a DRS, and obtain a further measurement value by measuring a CRS and/or a CSI-RS.

Optionally, on a basis of the foregoing embodiment, in another embodiment, the CRS and DRS hybrid measurement, CSI-RS and DRS hybrid measurement, and DRS, CRS, and CSI-RS hybrid measurement types in the measurement signal type sent by the sending unit are all used to instruct a UE to determine, by measuring a DRS to obtain a measured frequency or cell, whether the measured frequency or cell satisfies an event triggering condition, and determine whether a further measurement value obtained by measuring a CRS and/or a CSI-RS satisfies a TTT condition.

For an implementation process of functions and roles of each unit in the apparatus, refer to an implementation process of a corresponding step in the foregoing method; and details are not described herein again.

Figure 6:
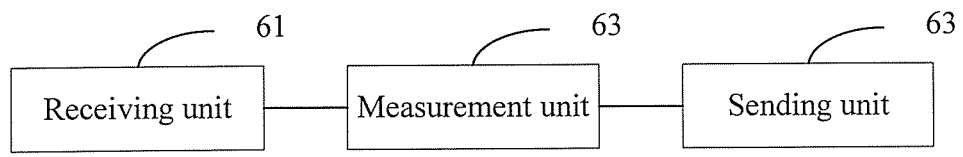
FIG. 6 is another schematic structural diagram of a measurement apparatus according to an embodiment of the present invention.

An embodiment of the present invention further provides a measurement apparatus, which is located on a second communications node, and a schematic structural diagram of the measurement apparatus is shown in FIG. 6. The measurement apparatus includes a receiving unit 61, a measurement unit 62, and a sending unit 63, where the receiving unit 61 is configured to receive measurement information sent by a first communications node, where the measurement information includes information of a measurement signal type, and the information of the measurement signal type is used by the second communications node to determine a signaling type corresponding to a measurement signal; the measurement unit 62 is configured to determine, according to the measurement information, the signaling type corresponding to the measurement signal, and measure the measurement signal corresponding to the signaling type to obtain a measurement report; and the sending unit 63 is configured to send the measurement report to the first communications node, where the measurement report carries a measurement result of measurement performed by the measurement apparatus according to the measurement information.

Optionally, on a basis of the foregoing embodiment, in another embodiment, the measurement signal type received by the receiving unit includes at least one of the following: cell-specific reference signal (CRS) whole-set measurement, CRS restricted measurement, channel state information reference signal (CSI-RS) measurement, discovery reference signal (DRS) measurement, CRS and DRS hybrid measurement, CSI-RS and DRS hybrid measurement, CRS and CSI-RS hybrid measurement, and DRS, CRS, and CSI-RS hybrid measurement.

Optionally, on a basis of the foregoing embodiment, in another embodiment, the CRS and DRS hybrid measurement, CSI-RS and DRS hybrid measurement, and DRS, CRS, and CSI-RS hybrid measurement types in the measurement signal type received by the receiving unit are all used to instruct a UE to obtain an initial value of a measured frequency or cell by measuring a DRS, and obtain a further measurement value by measuring a CRS and/or a CSI-RS.

Optionally, on a basis of the foregoing embodiment, in another embodiment, the CRS and DRS hybrid measurement, CSI-RS and DRS hybrid measurement, and DRS, CRS, and CSI-RS hybrid measurement types in the measurement signal type received by the receiving unit are all used to instruct a UE to determine, by measuring a DRS to obtain a measured frequency or cell, whether the measured frequency or cell satisfies an event triggering condition, and determine whether a further measurement value obtained by measuring a CRS and/or a CSI-RS satisfies a TTT condition.

For an implementation process of functions and roles of each unit in the apparatus, refer to an implementation process of a corresponding step in the foregoing method; and details are not described herein again.

Figure 7:
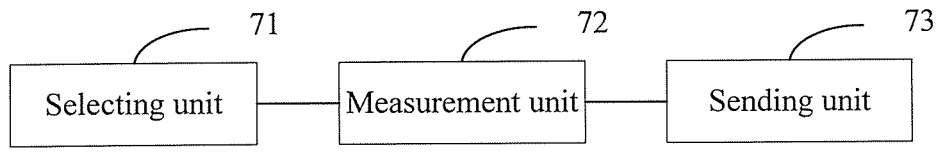
FIG. 7 is another schematic structural diagram of a measurement apparatus according to an embodiment of the present invention.

An embodiment of the present invention further provides a measurement apparatus, and a schematic structural diagram of the measurement apparatus is shown in FIG. 7. The measurement apparatus is located on a second communications node and includes a selecting unit 71, a measurement unit 72, and a sending unit 73, where the selecting unit 71 is configured to select information that is of a measurement signal type and for measurement; the measurement unit 72 is configured to measure, according to a signaling type corresponding to the selected information of the measurement signal type, a measurement signal corresponding to the signaling type to obtain a measurement report; and the sending unit 73 is configured to send the measurement report to a first communications node, where the measurement report carries a measurement result of measurement performed by the measurement apparatus on a measurement signal corresponding to the information of the signal type.

Optionally, on a basis of the foregoing embodiment, in another embodiment, the selecting unit includes:

a first selecting unit, configured to: when the measurement apparatus is connected to a macro cell, and a signal level and/or signal quality of a serving cell of the measurement apparatus is higher than a preset threshold, select DRS measurement to perform neighboring cell measurement; otherwise, select CRS and DRS hybrid measurement, CSI-RS and DRS hybrid measurement, or DRS, CRS, and CSI-RS hybrid measurement to perform neighboring cell measurement; and a second selecting unit, configured to: when the measurement apparatus is connected to a small cell, select DRS measurement to perform neighboring cell measurement, where the neighboring cell measurement includes intra-frequency neighboring cell measurement or inter-frequency neighboring cell measurement.

Optionally, on a basis of the foregoing embodiment, in another embodiment, the selecting unit includes:

a third selecting unit, configured to select the measurement signal type according to a historical measurement signal and/or a change of a radio signal of a cell; and if the change of the radio signal of the cell is relatively fast, select CRS and DRS hybrid measurement, CSI-RS and DRS hybrid measurement, or DRS, CRS, and CSI-RS hybrid measurement.

Optionally, on a basis of the foregoing embodiment, in another embodiment, the CRS and DRS hybrid measurement, CSI-RS and DRS hybrid measurement, or DRS, CRS, and CSI-RS hybrid measurement type selected by the first selecting unit is used to instruct the second communications node to obtain an initial value of a measured frequency or cell by measuring a DRS, and obtain a further measurement value by measuring a CRS and/or a CSI-RS; and the CRS and DRS hybrid measurement, CSI-RS and DRS hybrid measurement, or DRS, CRS, and CSI-RS hybrid measurement type selected by the third selecting unit is used to instruct the second communications node to obtain an initial value of a measured frequency or cell by measuring a DRS, and obtain a further measurement value by measuring a CRS and/or a CSI-RS.

Optionally, on a basis of the foregoing embodiment, in another embodiment, the CRS and DRS hybrid measurement, CSI-RS and DRS hybrid measurement, or DRS, CRS, and CSI-RS hybrid measurement type selected by the first selecting unit is further used to instruct the second communications node to determine, by measuring a DRS to obtain a measured frequency or cell, whether the measured frequency or cell satisfies an event triggering condition, and determine whether a further measurement value obtained by measuring a CRS and/or a CSI-RS satisfies a TTT condition; and the CRS and DRS hybrid measurement, CSI-RS and DRS hybrid measurement, or DRS, CRS, and CSI-RS hybrid measurement type selected by the third selecting unit is further used to instruct the second communications node to determine, by measuring a DRS to obtain a measured frequency or cell, whether the measured frequency or cell satisfies an event triggering condition, and determine whether a further measurement value obtained by measuring a CRS and/or a CSI-RS satisfies a TTT condition.

For an implementation process of functions and roles of each unit in the apparatus, refer to an implementation process of a corresponding step in the foregoing method; and details are not described herein again.

Figure 8:
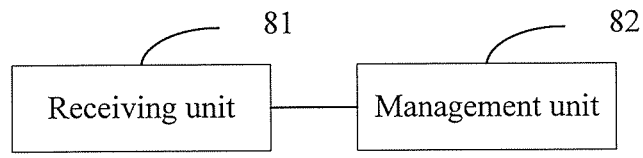
FIG. 8 is another schematic structural diagram of a measurement apparatus according to an embodiment of the present invention.

An embodiment of the present invention further provides a measurement apparatus, and a schematic structural diagram of the measurement apparatus is shown in FIG. 8. The measurement apparatus is located on a first communications node, and includes a receiving unit 81 and a management unit 82, where the receiving unit 81 is configured to receive a measurement report sent by a second communications node, where the measurement report carries a measurement result of measurement performed by the second communications node on a measurement signal corresponding to selected information that is of a measurement signal type and for measurement; and the management unit 82 is configured to determine signal quality of the second communications node according to the measurement report, and perform mobility management and scheduling on the second communications node.

For an implementation process of functions and roles of each unit in the apparatus, refer to an implementation process of a corresponding step in the foregoing method; and details are not described herein again.

Figure 9:
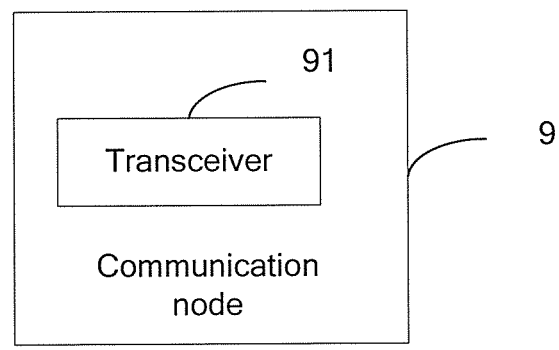
FIG. 9 is a schematic structural diagram of a communications node according to an embodiment of the present invention.

An embodiment of the present invention further provides a communications node, and a schematic structural diagram of the communications node is shown in FIG. 9. The communications node 9 includes a transceiver 91, where the transceiver is configured to send measurement information to a second communications node, where the measurement information includes information of a measurement signal type, and the information of the measurement signal type is used by the second communications node to determine a signaling type corresponding to a measurement signal; and receive a measurement report sent by the second communications node, where the measurement report carries a measurement result of measurement performed by the second communications node according to the measurement information.

In this embodiment, the second communications node may be another communications node except the communications node, or multiple other communications nodes, which is not limited in this embodiment.

Optionally, on a basis of the foregoing embodiment, in another embodiment, the measurement signal type received by the transceiver includes at least one of the following:

cell-specific reference signal (CRS) whole-set measurement, CRS restricted measurement, channel state information reference signal (CSI-RS) measurement, discovery reference signal (DRS) measurement, CRS and DRS hybrid measurement, CSI-RS and DRS hybrid measurement, CRS and CSI-RS hybrid measurement, and DRS, CRS, and CSI-RS hybrid measurement.

Optionally, on a basis of the foregoing embodiment, in another embodiment, the CRS and DRS hybrid measurement, CSI-RS and DRS hybrid measurement, or DRS, CRS, and CSI-RS hybrid measurement type in the measurement signal type received by the transceiver is used to instruct the second communications node to obtain an initial value of a measured frequency or cell by measuring a DRS, and obtain a further measurement value by measuring a CRS and/or a CSI-RS.

Optionally, on a basis of the foregoing embodiment, in another embodiment, the CRS and DRS hybrid measurement, CSI-RS and DRS hybrid measurement, or DRS, CRS, and CSI-RS hybrid measurement type in the measurement signal type received by the transceiver is further used to instruct the second communications node to determine, by measuring a DRS to obtain a measured frequency or cell, whether the measured frequency or cell satisfies an event triggering condition, and determine whether a further measurement value obtained by measuring a CRS and/or a CSI-RS satisfies a TTT condition.

For an implementation process of functions and roles of the transceiver in the communications node, refer to an implementation process of a corresponding step in the foregoing method; and details are not described herein again.

Figure 10:
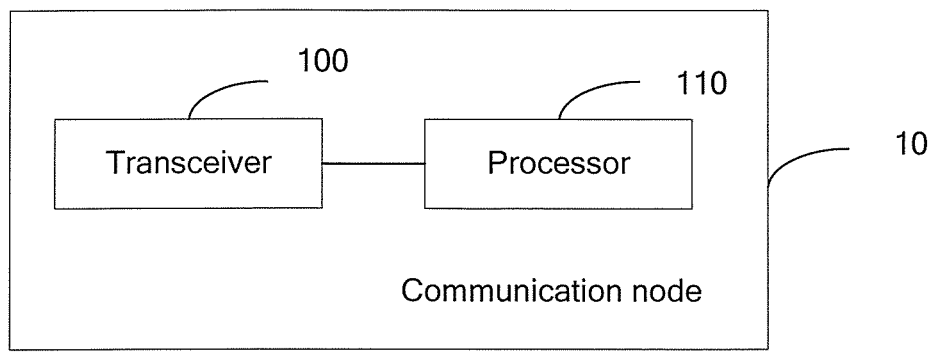
FIG. 10 is another schematic structural diagram of a communications node according to an embodiment of the present invention.

An embodiment of the present invention further provides a communications node, and a schematic structural diagram of the communications node is shown in FIG. 10. The communications node 10 includes a transceiver 100 and a processor 110, where the transceiver 100 is configured to receive measurement information sent by a first communications node, where the measurement information includes information of a measurement signal type, and the information of the measurement signal type is used by the communications node to determine a signaling type corresponding to a measurement signal; and the processor 110 is configured to determine, according to the measurement information, the signaling type corresponding to the measurement signal, and measure the measurement signal corresponding to the signaling type to obtain a measurement report; and the transceiver 100 is further configured to send the measurement report to the first communications node, where the measurement report carries a measurement result of measurement performed by the communications node according to the measurement information.

In this embodiment, the first communications node may be another communications node except the communications node, or multiple other communications nodes, which is not limited in this embodiment.

Optionally, on a basis of the foregoing embodiment, in another embodiment, the measurement signal type received by the transceiver includes at least one of the following: cell-specific reference signal (CRS) whole-set measurement, CRS restricted measurement, channel state information reference signal (CSI-RS) measurement, discovery reference signal (DRS) measurement, CRS and DRS hybrid measurement, CSI-RS and DRS hybrid measurement, CRS and CSI-RS hybrid measurement, and DRS, CRS, and CSI-RS hybrid measurement.

Optionally, on a basis of the foregoing embodiment, in another embodiment, the CRS and DRS hybrid measurement, CSI-RS and DRS hybrid measurement, or DRS, CRS, and CSI-RS hybrid measurement type in the measurement signal type received by the transceiver is used to instruct the communications node to obtain an initial value of a measured frequency or cell by measuring a DRS, and obtain a further measurement value by measuring a CRS and/or a CSI-RS.

Optionally, on a basis of the foregoing embodiment, in another embodiment, the CRS and DRS hybrid measurement, CSI-RS and DRS hybrid measurement, or DRS, CRS, and CSI-RS hybrid measurement type in the measurement signal type received by the transceiver is used to instruct the communications node to determine, by measuring a DRS to obtain a measured frequency or cell, whether the measured frequency or cell satisfies an event triggering condition, and determine whether a further measurement value obtained by measuring a CRS and/or a CSI-RS satisfies a TTT condition.

For an implementation process of functions and roles of the transceiver in the communications node, refer to an implementation process of a corresponding step in the foregoing method; and details are not described herein again.

An embodiment of the present invention further provides a communications node, and the communications node includes a processor and a transceiver, where the processor is configured to select information that is of a measurement signal type and for measurement, and measure, according to a signaling type corresponding to the selected information of the measurement signal type, a measurement signal corresponding to the signaling type to obtain a measurement report; and the transceiver is configured to send the measurement report to a first communications node, where the measurement report carries a measurement result of measurement performed by the communications node on a measurement signal corresponding to the information of the measurement signal type.

Optionally, on a basis of the foregoing embodiment, in another embodiment, selecting, by the processor, the information that is of the measurement signal type and for measurement includes:

if the communications node is connected to a macro cell, and a signal level and/or signal quality of a serving cell of the communications node is higher than a preset threshold, selecting, by the processor, DRS measurement to perform neighboring cell measurement; otherwise, selecting, by the processor, CRS and DRS hybrid measurement, CSI-RS and DRS hybrid measurement, or DRS, CRS, and CSI-RS hybrid measurement to perform neighboring cell measurement; or if the communications node is connected to a small cell, selecting, by the processor, DRS measurement to perform neighboring cell measurement; where the neighboring cell measurement includes intra-frequency neighboring cell measurement or inter-frequency neighboring cell measurement.

Optionally, on a basis of the foregoing embodiment, in another embodiment, selecting, by the processor, the information that is of the measurement signal type and for measurement includes:

selecting, by the processor, the measurement signal type according to a historical measurement signal and/or a change of a radio signal of a cell, which specifically includes: if the change of the radio signal of the cell is relatively fast, selecting, by the processor, CRS and DRS hybrid measurement, CSI-RS and DRS hybrid measurement, or DRS, CRS, and CSI-RS hybrid measurement.

Optionally, on a basis of the foregoing embodiment, in another embodiment, the CRS and DRS hybrid measurement, CSI-RS and DRS hybrid measurement, or DRS, CRS, and CSI-RS hybrid measurement type selected by the processor is used to instruct the communications node to obtain an initial value of a measured frequency or cell by measuring a DRS, and obtain a further measurement value by measuring a CRS and/or a CSI-RS.

Optionally, on a basis of the foregoing embodiment, in another embodiment, the CRS and DRS hybrid measurement, CSI-RS and DRS hybrid measurement, or DRS, CRS, and CSI-RS hybrid measurement type selected by the processor is further used to instruct the communications node to determine, by measuring a DRS to obtain a measured frequency or cell, whether the measured frequency or cell satisfies an event triggering condition, and determine whether a further measurement value obtained by measuring a CRS and/or a CSI-RS satisfies a TTT condition.

For an implementation process of functions and roles of the transceiver in the communications node, refer to an implementation process of a corresponding step in the foregoing method; and details are not described herein again.

An embodiment of the present invention further provides a communications node, and the communications node includes a processor and a transceiver, where the transceiver is configured to receive a measurement report sent by a second communications node, where the measurement report carries a measurement result of measurement performed by the second communications node on a measurement signal corresponding to selected information that is of a measurement signal type and for measurement; and the processor is configured to determine signal quality of the second communications node according to the measurement report, and perform mobility management and scheduling on the second communications node.

For an implementation process of functions and roles of the transceiver in the communications node, refer to an implementation process of a corresponding step in the foregoing method; and details are not described herein again.

For ease of understanding by a person skilled in the art, the following provides description by using specific application instances.

Application Instance 1

Figure 11:
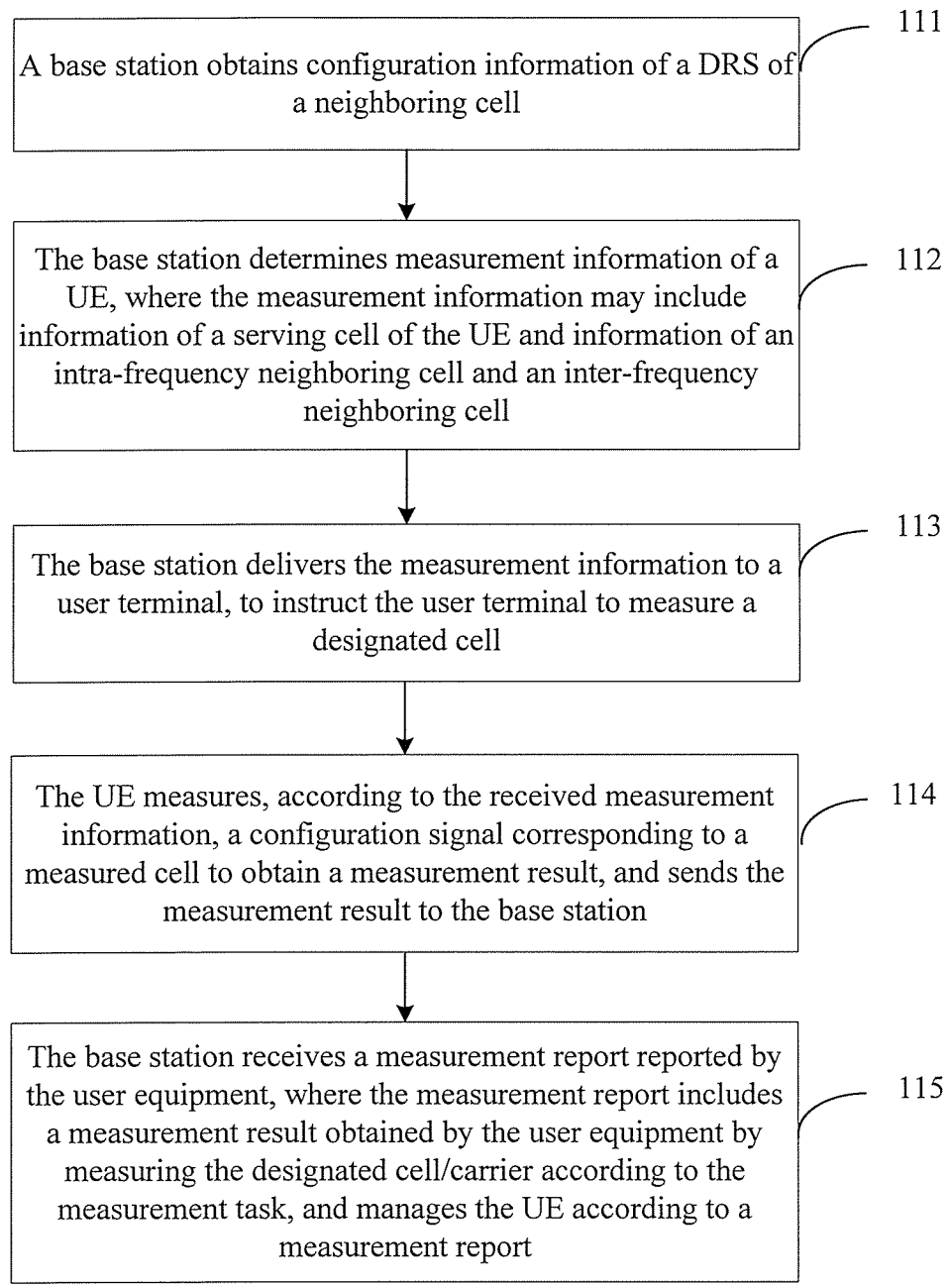
FIG. 11 is an exemplary diagram of an application of a measurement method according to an embodiment of the present invention.

Further referring to FIG. 11, FIG. 11 is a flowchart of an application instance of a measurement method according to an embodiment of the present invention. An enhanced cell in this embodiment may be a cell with an enhanced function, or a cell on a new type carrier, or a new type carrier, which is not limited in this embodiment. In this embodiment, that a first communications node is a base station and a second communications node is a UE is used as an example, which is not limited thereto. The method includes the following steps:

Step 111: The base station obtains configuration information of a DRS of a neighboring cell.

The configuration information of the DRS of the neighboring cell may be obtained through an X2 interface, or another interface (for example, a wireless interface) between the two base stations, or by means of operations, administration and maintenance (OAM), where the configuration information of the DRS is described as above, and therefore no further details is repeated herein.

Specifically, during setup of an interface between base stations, a base station and a neighboring base station exchanges, by receiving a carrier type that is of a designated carrier of a neighboring base station and sent by the neighboring base station, cell information of respective cells under coverage of the base station and the neighboring base station, where the cell information includes information such as a carrier frequency band, a carrier type, a cell ID (identity), and measurement signaling configuration of a cell.

The following provides description by using an example of setting up a connection between a base station 1 and a base station 2 through an X2 interface.

The base station 2 sends an X2 interface setup request (X2 setup request) message to the base station 1, where the request message carries cell information of a cell and a neighboring cell that are under coverage of the base station 2; and the base station 1 sends an X2 interface setup response (X2 setup response) message to the base station 2, where the response message carries cell information of a cell and a neighboring cell under coverage of the base station 1.

In another aspect, when establishing a connection, through an S1 interface, between the base station 1 and the base station 2, signaling interaction may be performed through a mobility management entity (MME), so that the base station 1 and the base station 2 obtain cell information of respective cells under coverage of the base station and the neighboring base station.

Step 111 is an optional step.

Step 112: The base station determines measurement information of the UE, where the measurement information may include information of a serving cell of the UE and information of an intra-frequency neighboring cell and an inter-frequency neighboring cell. For example, the measurement information includes a type (a common carrier or a carrier of a new carrier type) of a carrier where a cell is located, measurement information (including measurement configuration information), and the like.

The common carrier in this embodiment of the present invention is a conventional backward compatible carrier; the new type carrier is an enhanced non-backward compatible carrier, which may be a new carrier type NCT, a new carrier type proposed in Release-11 by the 3GPP. The NCT is considered as a non-backward compatible carrier, and an existing mechanism may be modified to enhance performance of the carrier, for example, enhancing spectral efficiency, improving supporting and energy-saving of a heterogeneous network, or the like.

To achieve the foregoing performance improvement, the measurement information provided to the UE in this embodiment of the present invention may include: a discovery reference signal (DRS), which is used for cell discovery and/or measurement; an SS (including a PSS/an SSS), which is used for cell discovery, and the signaling is optional; and a CSI-RS, which is mainly used for reporting of a CSI value, so that the UE performs cell discovery and/or measurement by using the foregoing information.

Step 113: The base station delivers the measurement information to a user terminal, to instruct the user terminal to measure a designated cell.

In this embodiment of the present invention, the base station may deliver a measurement task (that is, measurement information) to the user equipment by using a radio resource control (RRC) message, which is not limited thereto.

Each measurement task includes measurement object information and report configuration information, where the measurement object information is used to represent a designated cell/carrier that needs to be measured by the UE, and the report configuration information is used to determine configuration information that triggers the UE to send a measurement report to the base station. The measurement object information and the report configuration information are information element messages in the measurement task; the base station may preferably add reference signal indication information in the measurement object information or the report configuration information, which is not limited herein.

The measurement object information includes a combination of at least one of the following: a neighboring cell identity, measurement type configuration information, measurement signaling configuration information, and report configuration information.

Conventional cell configuration sent by the base station to the UE is conventional measurement configuration based on a cell-specific reference signal (CRS)/channel state information reference signal (CSI-RS); and the base station configures a new measurement manner for an enhanced cell.

The neighboring cell identity (not required in a case of RLM measurement or CSI reporting measurement) is a combination of at least one of a PCI, a DRS (set) identity, and a CSI-RS (set) identity.

A DRS in this embodiment of the present invention is a new signal that is used for cell discovery/cell identification/cell measurement (where "/" indicates a "and/or" relationship), and may also be called a track reference signal (TRS), a discovery signal (DS), or the like, and the name is not limited thereto.

A new measurement manner is as follows: if the measurement task includes RRM measurement, the UE performs measurement by using a DRS; if the measurement task includes CSI reporting measurement, the UE performs measurement by using a CSI-RS; if the measurement task includes RLM measurement, the UE performs measurement by using a DRS or a CSI-RS.

Measurement signaling configuration information includes: configuration information of a DRS, where the configuration information of the DRS includes antenna port information (where the antenna port information may be an antenna quantity and/or an antenna port number), frequency domain resource configuration information, code domain resource configuration information, subframe configuration information (including subframe shift information and period information), and a ratio of transmit power of a PDSCH to that of the DRS, where the ratio is assumed by the UE. The measurement information may further include synchronization information of a measured cell, such as an SFN shift/a subframe shift/a symbol shift. In addition, configuration of the DRS may be a whole-set of subframe or a subset of a DRS subframe. When the measured cell has ABS configuration, the UE may perform measurement by using an intersection of a measurement configuration set and a delivered set of restricted measurement.

Figure 12:
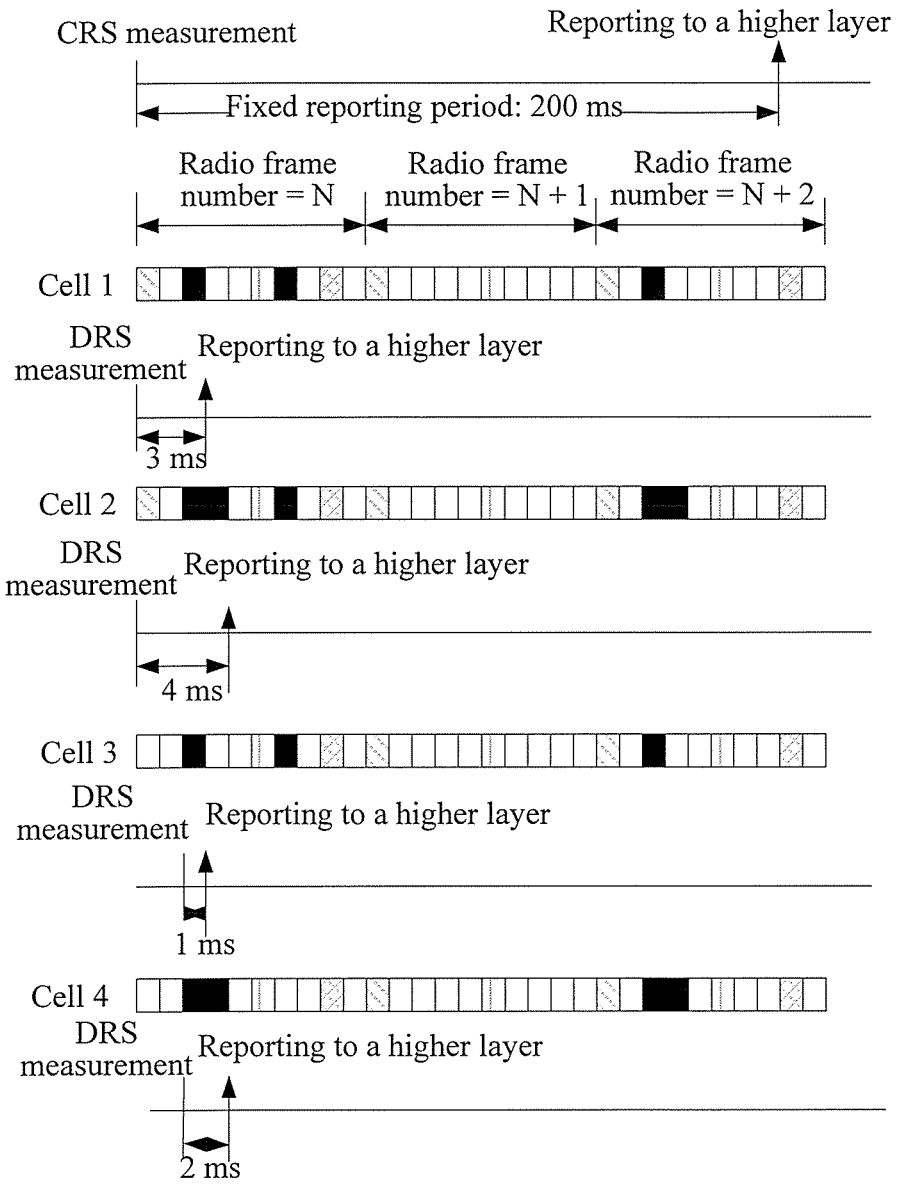
FIG. 12 is a schematic diagram of report configuration information according to an embodiment of the present invention.

A period value of measurement reported from a bottom layer to a higher layer is added in report configuration information. Optionally, for the value, precision and a transmission period of the DRS need to be taken into consideration. As shown in FIG. 12, FIG. 12 is a schematic diagram of a period value of reporting measurement according to an embodiment of the present invention.

As shown in FIG. 12, a cell 1 and a cell 2 send DRSs and SSs (synchronization signals); signal density of a DRS in a unit subframe of the cell 1 is higher, and measurement performed by using one subframe may meet measurement precision, and therefore, a period of reporting the measurement to a higher layer is 3 ms. Signal density of the DRS in a unit subframe of the cell 2 is lower, and measurement performed by using two subframes may meet measurement precision, and therefore, a period of reporting the measurement to the higher layer is 4 ms. DRSs sent by a cell 3 and a cell 4 also have a synchronization signal function; signal density of the DRS in a unit subframe of the cell 3 is higher, and measurement performed by using one subframe may meet the measurement precision, and therefore, a period of reporting the measurement to the higher layer is 1 ms. Signal density of the DRS in a unit subframe of the cell 4 is lower, and measurement performed by using two subframes may meet the measurement precision, and therefore, a period of reporting the measurement to the higher layer is 2 ms.

In this embodiment, the foregoing measurement configuration information may further include measurement indication information of a measured cell, such as m-RSRP measurement indication information and/or m-RSRQ measurement indication information (m may be a CRS, a CSI-RS, and/or a DRS). The foregoing measurement configuration information may further include measurement reporting manner indication information, which is used to instruct the UE to perform periodic measurement reporting or event measurement reporting on the measured cell. If a reporting manner indicated by the measurement reporting manner indication information is event measurement reporting, the measurement configuration information may further include a configuration hysteresis value and hysteresis time, a maximum quantity of measured cells that can be reported and a quantity of reporting times, and/or another auxiliary configuration parameter, such as a parameter regarding Layer 3 smooth filtering. If a reporting manner indicated by the measurement reporting manner indication information is periodic measurement reporting, the measurement configuration information may further include a configuration report period. Certainly, the foregoing parameters may also be pre-configured in the UE by default, which is not limited in this embodiment.

Step 114: The UE measures, according to the received measurement information, a configuration signal corresponding to a measured cell to obtain a measurement result, and sends the measurement result to the base station.

After receiving the measurement information sent by the base station, the UE may distinguish, according to a difference of RS configuration information of measured cells and/or configuration identifiers (for example, antenna port information or a configuration index number of CSI-RS/DRS configuration information) of the measured cells in the measurement information, different measured cells indicated by a same physical cell identity, and perform a measurement operation. The UE may measure a corresponding measured cell by using signaling configuration information of the measured cell, to obtain a measurement result of the measured cell, for example, DRS-RSRP and/or DRS-RSRQ of the measured cell. Further, the UE may bind the measurement result with at least one of signaling configuration information in the measurement configuration information, a configuration identifier of the measured cell, and a measurement index number. In a practical application, the UE may periodically measure the measured cell and report a measurement result of the measured cell. If the measurement configuration information received by the UE includes measurement indication information, such as m-RSRP measurement indication information and/or m-RSRQ measurement indication information, the UE may obtain, according to the measurement indication information, a measurement value required by the base station, and report, to the base station, the measurement value as a measurement result. For example, if the measurement information sent by the base station includes D-RSRP measurement indication information, the UE obtains D-RSRP of the measured cell; if the measurement information includes D-RSRQ measurement indication information, the UE obtains D-RSRQ of the measured cell.

Step 115: The base station receives a measurement report reported by the user equipment, where the measurement report includes a measurement result obtained by the user equipment by measuring a designated cell/carrier according to a measurement task, and manages the UE according to the measurement report.

If the measurement task is RRM measurement, after obtaining the measurement report, the base station can determine signal quality and signal strength of the designated cell/carrier according to the measurement result, so that the base station manages the user terminal and the designated cell/carrier. For example, the base station determines whether to add a new carrier for the user terminal, add a cell to a CoMP set, or maintain the designated cell/carrier; or determines an inter-cell handover scenario.

If the measurement task is CSI reporting, after obtaining the measurement report, the base station can determine signal quality of the UE in a serving cell/carrier (set) according to the measurement result, so that the base station determines a scheduling mechanism for the user terminal.

Application Instance 2

The application instance 2 differs from the application instance 1 in that:

In step 114, the UE measures configuration signaling corresponding to the measured cell in a different manner.

In this instance, first, the UE needs to actively select, according to a new mechanism, a type of signaling to be measured and a measurement manner.

In one selection manner, if the UE is connected to a macro cell, and a signal level and/or signal quality of a serving cell of the UE is higher than a threshold, for example, RSRP>Threshold, the UE uses a DRS measurement type to perform measurement on a neighboring cell; on the contrary, if a signal level and/or signal quality of a serving cell of the UE is lower than a threshold, for example, the UE is at an edge of a cell, and RSRP<Threshold, the UE uses a 'CRS or CSI-RS or DRS with CRS/CSI-RS measurement type' to perform measurement on the neighboring cell.

If the UE is connected to a small cell, for example, an NCT cell, the UE uses a DRS measurement type to perform measurement on a neighboring cell. The neighboring cell in this embodiment may be an intra-frequency neighboring cell or an inter-frequency neighboring cell, which is not limited in this embodiment.

In another selection manner, the UE may also select a measurement signaling category and type by grasping a change of a radio signal of a cell in a specific scenario according to historical measurement signaling. For example, the radio signal of the cell changes fast; to avoid a ping-pong handover and a premature handover that are caused by dependence only on DRS measurement, a CRS and DRS hybrid measurement, CSI-RS and DRS hybrid measurement, or DRS, CRS, and CSI-RS hybrid measurement method may be used. For example, the UE first obtains an initial value of a neighboring cell by measuring a DRS, and then measures a CRS and/or a CSI-RS to meet a subsequent reporting requirement of hysteresis and TTT.

Then, the UE may distinguish, according to a difference of RS configuration information of measured cells and/or configuration identifiers (for example, antenna port information or a configuration index number of CSI-RS/DRS configuration information) of the measured cells in the measurement configuration information, different measured cells indicated by a same physical cell identity, and perform a measurement operation. The UE may measure a corresponding measured cell by using signaling configuration information of the measured cell, to obtain a measurement result of the measured cell, for example, DRS-RSRP and/or DRS-RSRQ of the measured cell. Optionally, the UE may bind the measurement result with at least one of signaling configuration information in the measurement configuration information, a configuration identifier of the measured cell, and a measurement index number. In a practical application, the UE may periodically measure the measured cell and report a measurement result of the measured cell. If the measurement configuration information received by the UE includes measurement indication information, such as m-RSRP measurement indication information and/or m-RSRQ measurement indication information, the UE may obtain, according to the measurement indication information, a measurement value required by the base station, and report, to the base station, the measurement value as a measurement result. For example, if a measurement request message includes D-RSRP measurement indication information, the UE obtains D-RSRP of the measured cell; if the measurement request message includes D-RSRQ measurement indication information, the UE obtains D-RSRQ of the measured cell.

This embodiment of the present invention may be applied to a CoMP communications system, where the communications system includes multiple interconnected access points or transmission points, such as base stations, where the base stations may be macro base stations (Macro eNBs or eNBs), micro base stations (which may be Picos, Relays, HeNBs, HNBs, or RRHs), or the like, which is not limited herein. Anyhow, each of the base stations is a site or a transmission point.

In the embodiment of the present invention, an eNB is used as an example to represent a macro base station corresponding to a macro cell, and an RRH is used as an example to represent a micro base station corresponding to a micro cell. Generally, a wireless communications system may include a homogeneous network communications system and a heterogeneous network communications system, where interconnected base stations in the homogeneous network communications system are all macro cell base stations, and interconnected base stations in the heterogeneous network communications system may be a macro cell base station and a micro cell base station. All base stations in the foregoing CoMP communications system together provide services for a terminal, where the terminal generally refers to a UE (user equipment), or may be called a user terminal or a terminal.

In the embodiments of the present invention, a UE may be any one of the following and may be either static or mobile. A static UE may specifically include a terminal, a mobile station, a subscriber unit, a station, or the like. A mobile UE may specifically include a cellular phone, a personal digital assistant (PDA), a wireless modem, a wireless communications device, a handheld device, a laptop computer, a cordless phone, a wireless local loop (WLL) station, or the like. The UEs may be distributed in an entire wireless network.

It should be noted that in this specification, relational terms such as first and second are only used to distinguish one entity or operation from another, and do not necessarily require or imply that any actual relationship or sequence exists between these entities or operations. Moreover, the terms "include", "comprise", or any other variant of them is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

Based on the foregoing descriptions of the embodiments, a person skilled in the art may clearly understand that the present invention may be implemented by software in addition to a necessary universal hardware platform or by hardware only. In most circumstances, the former is a preferred implementation manner. Based on such an understanding, the technical solutions of the present invention essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, a network device, or the like) to perform the methods described in the embodiments or some parts of the embodiments of the present invention.

The foregoing descriptions are merely exemplary implementation manners of the present invention. It should be noted that a person of ordinary skill in the art may make several improvements or polishing without departing from the principle of the present invention and the improvements or polishing shall fall within the protection scope of the present invention.

What is claimed is:

1. A measurement method, comprising:
   sending, by a first communications node, measurement information to a second communications node, wherein the measurement information comprises information of a measurement signal type, and the information of the measurement signal type is used by the second communications node to determine a signaling type corresponding to a measurement signal; and
   receiving, by the first communications node, a measurement report sent by the second communications node, wherein the measurement report carries a measurement result of measurement performed by the second communications node according to the measurement information;
   wherein the measurement signal type comprises at least one of the following:
   cell-specific reference signal (CRS) whole-set measurement, CRS restricted measurement, channel state information reference signal (CSI-RS) measurement, discovery reference signal (DRS) measurement, CRS and DRS hybrid measurement, CSI-RS and DRS hybrid measurement, CRS and CSI-RS hybrid measurement, and DRS, CRS, and CSI-RS hybrid measurement;
   wherein the CRS and DRS hybrid measurement, CSI-RS and DRS hybrid measurement, or DRS, CRS, and CSI-RS hybrid measurement is used to instruct the second communications node to obtain an initial value of a measured frequency or cell by measuring a DRS, and obtain an additional measurement value by measuring at least one of a CRS and a CSI-RS.

2. A measurement method, comprising:
   receiving, by a second communications node, measurement information sent by a first communications node, wherein the measurement information comprises information of a measurement signal type;
   determining, by the second communications node according to the measurement information, a signaling type corresponding to a measurement signal, and measuring the measurement signal corresponding to the signaling type to obtain a measurement report; and
   sending, by the second communications node, the measurement report to the first communications node, wherein the measurement report carries a measurement result of measurement performed by the second communications node according to the measurement information;
   wherein the measurement signal type comprises at least one of the following:
   cell-specific reference signal (CRS) whole-set measurement, CRS restricted measurement, channel state information reference signal (CSI-RS) measurement, discovery reference signal (DRS) measurement, CRS and DRS hybrid measurement, CSI-RS and DRS hybrid measurement, CRS and CSI-RS hybrid measurement, and DRS, CRS, and CSI-RS hybrid measurement;
   wherein the CRS and DRS hybrid measurement, CSI-RS and DRS hybrid measurement, or DRS, CRS, and CSI-RS hybrid measurement is used to instruct the second communications node to obtain an initial value of a measured frequency or cell by measuring a DRS, and obtain an additional measurement value by measuring at least one of a CRS and a CSI-RS.

3. A measurement apparatus for use on a first communications node, the apparatus comprising:
   a processor;
   memory coupled to the processor, the memory comprising instructions that, when executed by the processor, cause the measurement apparatus to:
   send measurement information comprising information of a measurement signal type to a second communications node for determining a signaling type corresponding to a measurement signal; and
   receive a measurement report from the second communications node, wherein the measurement report carries a measurement result of a measurement performed by the second communications node according to the measurement information;
   wherein the measurement signal type comprises at least one of the following:
   cell-specific reference signal (CRS) whole-set measurement, CRS restricted measurement, channel state information reference signal (CSI-RS) measurement, discovery reference signal (DRS) measurement, CRS and DRS hybrid measurement, CSI-RS and DRS hybrid measurement, CRS and CSI-RS hybrid measurement, and DRS, CRS, and CSI-RS hybrid measurement; and
   wherein the CRS and DRS hybrid measurement, CSI-RS and DRS hybrid measurement, or DRS, CRS, and CSI-RS hybrid measurement is used to instruct the second communications node to obtain an initial value of a measured frequency or cell by measuring a DRS, and obtain an additional measurement value by measuring at least one of a CRS and a CSI-RS.

4. A measurement apparatus for use on a second communications node, the apparatus comprises:
   a processor;
   memory coupled to the processor, the memory comprising instructions that, when executed by the processor, cause the measurement apparatus to:
   receive measurement information comprising information of a measurement signal type from a first communications node for determining a signaling type corresponding to a measurement signal;
   a measurement unit, configured to determine, according to the measurement information, the signaling type corresponding to the measurement signal, and measure the measurement signal corresponding to the signaling type to obtain a measurement report; and send the measurement report to the first communications node, wherein the measurement report carries a measurement result of a measurement performed by the measurement apparatus according to the measurement information;

wherein the measurement signal type comprises at least one of the following:

cell-specific reference signal (CRS) whole-set measurement, CRS restricted measurement, channel state information reference signal (CSI-RS) measurement, discovery reference signal (DRS) measurement, CRS and DRS hybrid measurement, CSI-RS and DRS hybrid measurement, CRS and CSI-RS hybrid measurement, and DRS, CRS, and CSI-RS hybrid measurement; and wherein the CRS and DRS hybrid measurement, CSI-RS and DRS hybrid measurement, or DRS, CRS, and CSI-RS hybrid measurement is used to instruct the second communications node to obtain an initial value of a measured frequency or cell by measuring a DRS, and obtain an additional measurement value by measuring at least one of a CRS and a CSI-RS.

* * * * *